United States Patent [19]

Akiba

[11] Patent Number: 4,875,359
[45] Date of Patent: Oct. 24, 1989

[54] ATTACHMENT RING FOR A LIQUID LEAKAGE SENSOR USED IN DRAIN OPENINGS

[75] Inventor: Jyuji Akiba, Saitama, Japan
[73] Assignee: Junkosha Co., Ltd., Japan
[21] Appl. No.: 257,317
[22] Filed: Oct. 13, 1988

[30] Foreign Application Priority Data

Oct. 16, 1987 [JP] Japan .................... 62-157

[51] Int. Cl.⁴ .................................. G01M 3/00
[52] U.S. Cl. ........................................ 73/40
[58] Field of Search ............. 73/40, 49.2, 40.5 R; 340/605; 405/53, 54; 37/312

[56] References Cited

U.S. PATENT DOCUMENTS

| | | | |
|---|---|---|---|
| 2,780,303 | 2/1957 | Yavitch | 73/40 |
| 3,505,820 | 4/1970 | Draper et al. | 405/53 |
| 4,305,068 | 12/1981 | Klein | 73/40 |
| 4,624,604 | 11/1986 | Wagner et al. | 405/53 |
| 4,682,492 | 7/1987 | Green | 73/49.2 |

FOREIGN PATENT DOCUMENTS 1957175  3/1971  Fed. Rep. of Germany ........ 405/53

Primary Examiner—Hezron E. Williams
Attorney, Agent, or Firm—Mortenson & Uebler

[57] ABSTRACT

An attachment ring assembly is provided for installation in drain openings. The assembly includes a cylindrical ring body installed in the drain opening, the ring body extending over the entire circumference of the discharge port of the drain opening, the ring body having a relatively small liquid-collecting opening in the lower end of the cylindrical ring. A liquid leak detecting sensor is installed in the liquid-collecting opening. A liquid leak which flows into the drain is dammed by the attachment ring assembly and channelled to flow into the liquid-collecting opening and to the sensor, thereby substantially reducing the time which would otherwise be required to detect the leak.

1 Claim, 2 Drawing Sheets

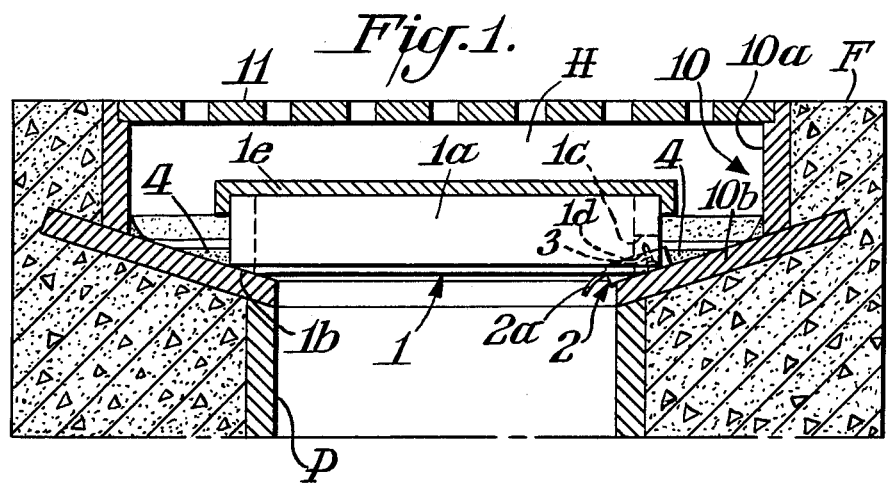
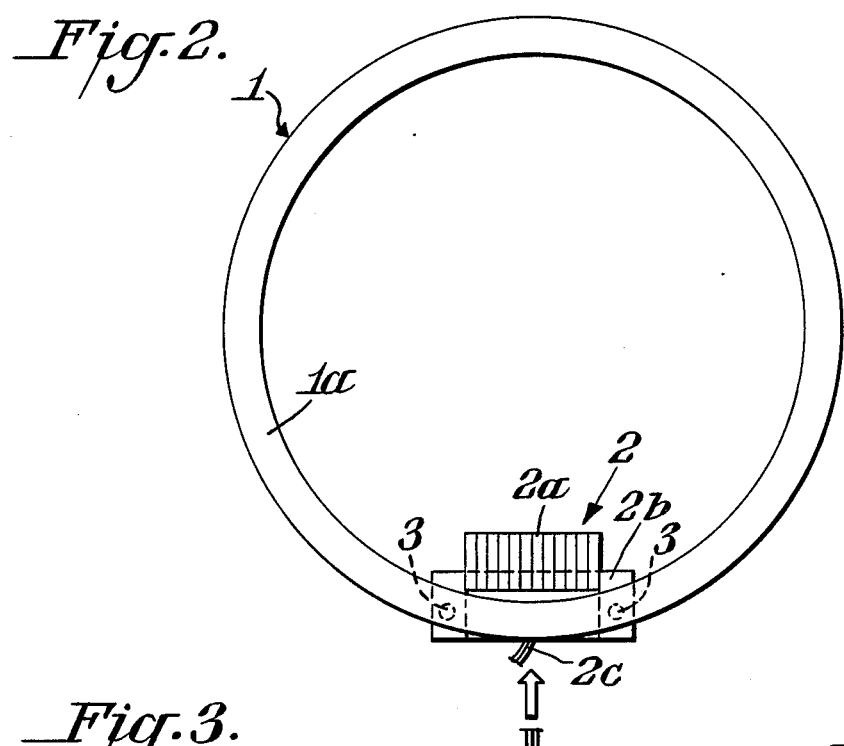
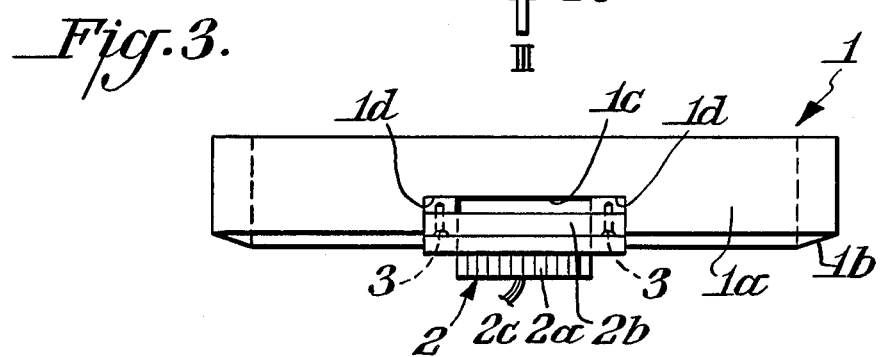

ATTACHMENT RING FOR A LIQUID LEAKAGE SENSOR USED IN DRAIN OPENINGS

BACKGROUND OF THE INVENTION

The present invention relates to an attachment ring for a liquid leakage sensor used in drain openings which is used to attach a liquid leakage sensor to the upper portion of a drain opening.

In nuclear power generating stations, thermal power generating stations and chemical plants, the earliest possible detection of leaking liquids such as water flowing into drain openings is necessary. One method of meeting such demands is to install a small liquid leakage sensor on the peripheral wall of the drain opening involved. In the past, however, there has been no means of installing such liquid leakage sensors inside drain openings in a reliable and effective manner. Accordingly, there has been a demand for the development of such means. The object of the present invention is to meet this demand.

SUMMARY OF THE INVENTION

An attachment ring for a liquid leakage sensor used in drain openings is provided comprising a cylindrical ring for installation in the drain opening, this ring having a top and bottom end, the ring extending over the entire circumference of the discharge of the drain opening when installed, the ring having a relatively small liquid-collecting opening in the bottom end of the cylindrical ring and a liquid leak detecting sensor is installed in the liquid-collecting opening, whereby, a liquid leak which flows into the drain is dammed by the attachment and channelled to flow into the liquid-collecting opening and to the sensor, thereby substantially reducing the time which would otherwise be required to detect the leak.

BRIEF DESCRIPTION OF THE DRAWINGS

FIG. 1 is a schematic diagram, partly in cross-section, which illustrates the attachment ring according to the invention installed in a drain opening.

FIG. 2 is a top plan view of the attachment ring and a leak detecting sensor attached to the ring.

FIG. 3 is an end elevation of the attachment ring and leak detecting sensor in the direction indicated by arrow 3 in FIG. 2.

Figure 4:
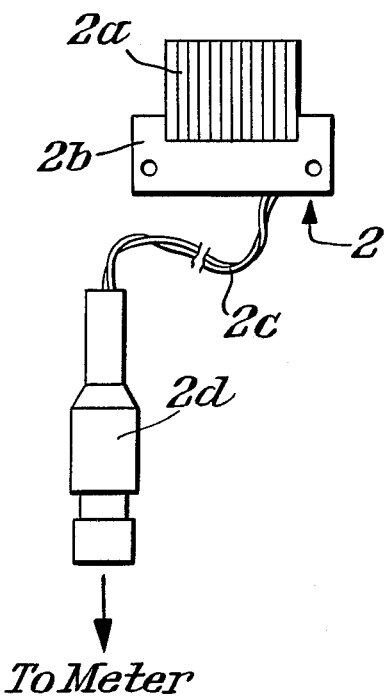
FIG. 4 is a top plan view of the leak detecting sensor attached to a connector.

DETAILED DESCRIPTION OF THE INVENTION AND PREFERRED EMBODIMENTS WITH REFERENCE TO THE DRAWINGS

An attachment ring assembly is provided for installation in drain openings. The assembly includes a cylindrical ring body installed in the drain opening, the ring body extending over the entire circumference of the discharge port of the drain opening, the ring body having a relatively small liquid-collecting opening in the lower end of the cylindrical ring. A liquid leak detecting sensor is installed in the liquid-collecting opening. A liquid leak which flows into the drain is dammed by the attachment ring assembly and channelled to flow into the liquid-collecting opening and to the sensor, thereby substantially reducing the time which would otherwise be required to detect the leak.

More specifically, the present invention comprises an attachment ring for a liquid leakage sensor used in drain openings which is a ring used to attach a liquid leakage sensor to a drain opening. The opening has a circular shelf in the upper portion of the opening. The attachment ring is characterized by the fact that it consists of a body which is formed in the shape of a ring and which is installed on the top surface of the aforementioned shelf in the drain opening, and which has a liquid-collecting opening cut out of the lower end surface of the ring body, and a leak detecting sensor is installed on the ring body inside the liquid-collecting opening.

The attachment ring for a liquid leakage sensor used in drain openings provided by the present invention collects a leaking liquid in the liquid-collecting opening by means of the ring body which is installed on the upper surface of the shelf in the drain opening. The leaking liquid which drains through the liquid-collecting opening is then detected by the liquid leakage sensor. Thus, early detection of liquid leakage is possible.

One example of application of the present invention will be described with reference to the attached figures.

In FIG. 1, H indicates a drain opening. This drain opening H is installed in a floor surface F, and is designed so that it drains any liquid which has leaked onto the floor surface F into a drain pipe P. A drain fixture 10, generally made of stainless steel, for the purpose of conducting leaking liquid from the floor surface F into the drain pipe P, which has a prescribed diameter, is embedded in the drain opening H. This drain fixture 10 consists of a cylindrical part 10a and a funnel-shaped part 10b which slopes inwardly. A cover 11 is fitted into the upper portion of the cylindrical part 10a. A plurality of openings in cover 11 allow the passage of leaking liquid into the drain.

The attachment ring 1 for a liquid leakage sensor used in drain openings in this example of application of the present invention is designed that it is attached to the upper surface of a shelf in the drain opening H, i.e., to the upper surface of the funnel-shaped part 10b of the drain fixture 10, which is a step lower than the floor surface F.

The attachment ring 1 comprises a ring body 1a which is preferably formed by cutting a thick stainless steel pipe to a prescribed length. An inclined surface 1b, which inclines at the same angle as the upper surface of the aformentioned funnel-shaped part 10b, is formed in the lower end surface of the ring body 1a, so that when the ring body 1a is installed on the funnel-shaped part 10b, the inclined surface 1b of the ring body 1a is in contact with the upper surface of the funnel-shaped part 10b. Thus, the ring body 1a is inserted so that the center of the ring body 1a coincides with the vertical axis of the drain pipe P. A liquid-collecting opening 1c is formed at one point in the lower end surface of the ring body 1a. As shown in FIG. 3, this liquid-collecting opening 1c preferably is cut out so that it forms a laterally oriented rectangle.

Preferably, cut-outs 1d are formed on both the left and right sides of the liquid-collecting opening 1c as shown in FIG. 3. The upper surfaces of these left and right cut-outs constitute sensor attachment parts. As shown in FIG. 1, these sensor attachment parts are inclined surfaces which slope inwardly at a prescribed angle, and are arranged so that a liquid leakage sensor 2 can be attached from below by means of screws, 3, 3. Accordingly, the liquid leakage sensor 2 is attached inside the liquid-collecting opening 1c so that sensor 2 is inclined inwardly. The lower surface of the sensor 2 is in the same plane as the inclined surface 1b of the ring body 1a, and is in contact with the upper surface of the aforementioned funnel-shaped part 10b. The liquid leakage sensor 2 is preferably positioned in the lower portion of the liquid-collecting opening 1c, and is attached so that the upper portion of the liquid-collecting opening 1c is not blocked.

As shown in FIG. 4, the liquid leakage sensor 2 comprises a sensing element 2a attached to a glass epoxy substrate 2b, and this sensing element 2a is connected to an external liquid leakage monitoring device, not shown, by lead wires 2c and a connector 2d. The sensing element 2a detects a leaking liquid by utilizing the conductivity of the leaking liquid as it runs down across the upper surface of the sensing element 2a. When the sensor 2 is attached to ring body 1a, the sensing element 2a bends downwardly as shown in FIG. 1, so that the leaking liquid runs off of the sensing element 2a.

The attachment ring 1, with the liquid leakage sensor 2 attached, is attached to the upper portion of the funnel-shaped part 10b of the drain fixture 10. The attachment ring 1 is placed on the upper surface of the funnel-shaped part 10b, and the position of the attachment ring 1 is adjusted so that the inclined surface 1b on the lower end surface of the ring body 1a is in contact with the upper surface of the funnel-shaped part 10b. The attachment ring 1 is installed in this position. The center of the attachment ring 1 coincides with the axial line of the drain pipe P. Accordingly, the attachment ring 1 is positioned in the center of the funnel-shaped part 10b as shown in FIG. 1, and the attachment ring 1 is stable as a result of its own weight. An adhesive filler 4 is preferably applied to the annular corner area formed by the circumference of the attachment ring 1 and the upper surface of the funnel-shaped part 10b, so that the ring body 1a and the funnel-shaped part 10b are bonded together with a liquid-tight seal. The thickness of the applied layer of filler 4 is set so that it reaches only the lower portion of the liquid-collecting opening 1c in which the liquid leakage sensor 2 is positioned, thus insuring that the upper portion of the liquid-collecting opening 1c is not blocked. The filler 4 may be applied so that it forms a horizontal surface on the upper surface of the funnel-shaped part 10b, or so that it forms an inclined surface which slopes downwardly toward the center, thus preventing the pooling of liquid on the upper surface of the funnel-shaped part 10b.

Any conductive liquid such as water which flows out across the floor surface F, will drop into the drain opening H through the holes in the cover 11, and will be received by the upper surface of the aforementioned funnel-shaped part 10b. The leaking liquid received by the funnel-shaped part 10b is dammed by the ring body 1a, and drains into the drain pipe P only through the upper portion of the liquid-collecting opening 1c. Preferably, cap 1e, of stainless steel, covers ring body 1, as shown in FIG. 1. Accordingly, all of the leaking liquid is collected into the liquid-collecting opening 1c, and it flows across the surface of the sensing element 2a of the liquid leakage sensor 2. As a result, the liquid leakage sensor 2 reliably detects the leaking liquid very nearly at the time that leakage begins.

As described above, the attachment ring for a liquid leakage sensor used in drain openings provided by the present invention is designed to have a ring body attached to the shelf of the drain opening, and leaking liquid is collected into a relatively small liquid-collecting opening formed in the ring body. The leaking liquid which drains through this liquid-collecting opening is then detected by a liquid leakage sensor. Accordingly, leaking liquid can be collected and reliably detected from the time that leakage begins.

Because the aforementioned liquid-collecting opening and attachment parts for the liquid leakage sensor are formed in a single ring body, the number of parts involved is small, and the attachment ring can be manufactured by simple machining.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. An attachment ring for a liquid leakage sensor used in drain openings comprising a cylindrical ring for installation in said drain opening, said ring having a top and bottom end, said ring extending over the entire circumference of the discharge of the drain opening when installed, said ring having a relatively small liquid-collecting opening in the bottom end of said cylindrical ring, and a liquid leak detecting sensor installed in said liquid-collecting opening, whereby, a liquid leak which flows into said drain is dammed by said attachment ring and channelled to flow into said liquid-collecting opening and to said sensor, thereby substantially reducing the time which would otherwise be required to detect said leak.

* * * * *